US009141847B2

(12) United States Patent
Shin et al.

(10) Patent No.: US 9,141,847 B2
(45) Date of Patent: Sep. 22, 2015

(54) METHOD AND APPARATUS FOR IDENTIFYING FAKE FINGERPRINT

(71) Applicant: SUPREMA INC., Seongnam-si (KR)

(72) Inventors: Ho Chul Shin, Seongnam-si (KR); Jin Wook Yi, Seongnam-si (KR); Yong Bae Lee, Seongnam-si (KR); Bo Gun Park, Seongnam-si (KR); Bong Seop Song, Seongnam-si (KR); Jae Won Lee, Seongnam-si (KR)

(73) Assignee: SUPREMA INC., Gyeonggi-Do (KR)

( * ) Notice: Subject to any disclaimer, the term of this patent is extended or adjusted under 35 U.S.C. 154(b) by 134 days.

(21) Appl. No.: 14/140,329

(22) Filed: Dec. 24, 2013

(65) Prior Publication Data

US 2014/0286548 A1 Sep. 25, 2014

(30) Foreign Application Priority Data

Mar. 21, 2013 (KR) ........................ 10-2013-0030468

(51) Int. Cl.
*G06K 9/00* (2006.01)
(52) U.S. Cl.
CPC .......... *G06K 9/00114* (2013.01); *G06K 9/0012* (2013.01); *G06K 2009/0006* (2013.01)
(58) Field of Classification Search
CPC combination set(s) only.
See application file for complete search history.

(56) References Cited

U.S. PATENT DOCUMENTS

| 3,975,711 | A | * | 8/1976 | McMahon | 382/126 |
| 4,414,684 | A | * | 11/1983 | Blonder | 382/127 |
| 5,812,252 | A | * | 9/1998 | Bowker et al. | 356/71 |
| 6,031,942 | A | * | 2/2000 | Nakayama | 382/284 |
| 6,185,317 | B1 | * | 2/2001 | Nakayama | 382/124 |
| 6,826,000 | B2 | * | 11/2004 | Lee et al. | 359/833 |
| 8,027,519 | B2 | * | 9/2011 | Maro et al. | 382/115 |
| 2003/0025897 | A1 | * | 2/2003 | Iwai | 356/71 |
| 2004/0179723 | A1 | * | 9/2004 | Sano et al. | 382/124 |
| 2010/0098302 | A1 | * | 4/2010 | Shin et al. | 382/124 |
| 2010/0141380 | A1 | * | 6/2010 | Pishva | 340/5.2 |
| 2013/0051637 | A1 | * | 2/2013 | Kulcke et al. | 382/124 |
| 2014/0023249 | A1 | * | 1/2014 | Higuchi | 382/127 |

* cited by examiner

*Primary Examiner* — Anand Bhatnagar
(74) *Attorney, Agent, or Firm* — Ladas & Parry, LLP

(57) ABSTRACT

An apparatus for identifying a fake fingerprint, the apparatus comprising: a prism having a fingerprint contact surface with which a fingerprint comes in contacted; an internal light source configured to irradiate light from the inside of the prism; an external light source configured to irradiate light from the outside of the prism; an image sensor configured to acquire diffused light image by the internal light source and transmitted light image by the external light source; and a controller configured to compare the diffused light image and the transmitted light image acquired by the image sensor to determine whether the fingerprint is a fake fingerprint or not.

11 Claims, 7 Drawing Sheets

FINGERPRINT IMAGE BY
INTERNAL LIGHT SOURCE $f_{internal}(x,y)$

FINGERPRINT IMAGE BY
EXTERNAL LIGHT SOURCE $f_{external}(x,y)$

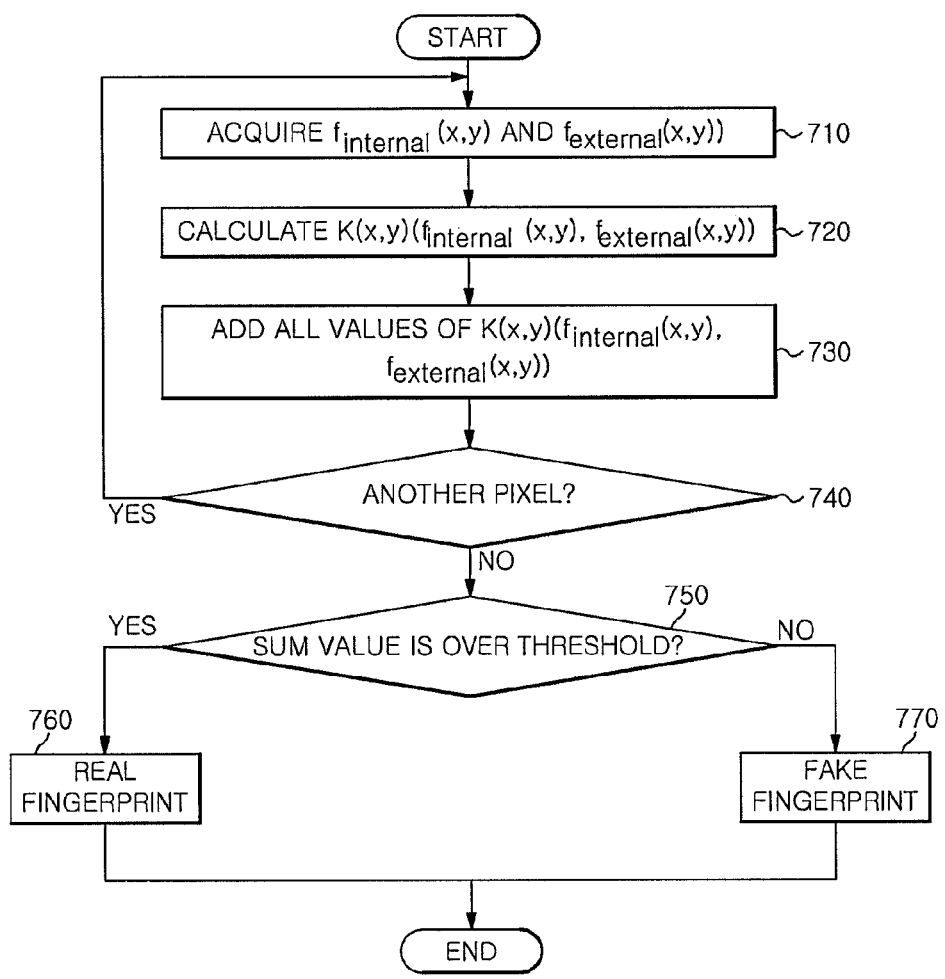

METHOD AND APPARATUS FOR IDENTIFYING FAKE FINGERPRINT

RELATED APPLICATIONS

This application claims the benefit of Korean Patent Application No. 10-2013-0030468, filed on Mar. 21, 2013, which is hereby incorporated by reference in its entirety (as if fully set forth herein).

FIELD OF THE INVENTION

The present invention relates to an apparatus and method for recognizing fingerprint, and more particularly, to an apparatus and method for identifying fake fingerprint using a fingerprint shape image.

BACKGROUND OF THE INVENTION

The user's biometric information already came into general use to perform individual authentication using information devices because of its highly invariance and uniqueness. Among other things, fingerprint recognition becomes a certification means that is receiving most attention and generalized for a simple structure and a superior performance in comparison to other means.

An individual authentication is mainly used in the field that requires the importance of security such as access control, e-commerce, financial transaction, security of a personal computer (PC), office settlement system, etc., and thus it is more important than anything to effectively identify a fingerprint that is made artificially (hereinafter referred to as a 'fake fingerprint').

Therefore, a technique for identifying fake fingerprint is proposed in which physiological material such as hemoglobin is analyzed through spectral distribution characteristic of light that is reflected or scattered from a finger after providing the light to the finger. Another technique senses the variation in capacitance caused by a finger when fingerprint is touched on a metal plate of a fingerprint sensor prism in a state where a small amount of charges is formed on the metal plate, thereby identifying the fake fingerprint.

In addition, another technique of identifying fake fingerprint throws light on a finger but irradiates from the outside of the finger so that the light passes through along an inner surface adjacent to the surface of the finger and obtains a surface image from the light that has passed through the finger and exited to the outside. The surface image is then analyzed to determine whether it is derived from the fake fingerprint.

In general, because a living body is subjected to a high extent of light attenuation, the light is rapidly attenuated and is vanished while progressing in the living body. On the contrary, for a fake fingerprint, most of the light passes through the fake fingerprint to yield a small difference between an incident light amount and a transmitted light amount due to a low light attenuation of the fake fingerprint. Based on this phenomenon, the aforementioned techniques can identify the fake fingerprint.

However, the following problems occur in applying these conventional techniques to a diffusive fingerprint sensor that is widely used in the field of fingerprint recognition. In the characteristic of a total reflection fingerprint sensor, the problem is that there may be the difference in the transmitted light amount that is detected depending on the degree of contact between the fingerprint and the sensor. In other words, if the contact between the fingerprint and the sensing surface of the sensor is not good due to a dried surface of the fingerprint even though the finger has the same transmission characteristic, the transmitted light amount is substantially less. On the contrary, if the contact is good, the transmitted light amount increases. Consequently, the accuracy of fake fingerprint identification using the gray level distribution of the surface image decreases significantly.

That is, in the diffusive fingerprint sensor, the fake fingerprint identification technique using an external light source may occur the judgment error caused by the difference in the contact degree depending on the state of the fingerprint since the amount of the light that passes through the inside of the prism varies according to the degree of contact between the finger and the surface of the prism.

SUMMARY OF THE INVENTION

In view of the above, the present invention provides an apparatus and method for identifying fake fingerprint, which is robust to the change in degree of contact between a fingerprint and a prism depending on the state of a fingerprint.

In accordance with an aspect of the present invention, there is provided an apparatus for identifying a fake fingerprint, which includes: a prism having a fingerprint contact surface with which a fingerprint comes in contacted; an internal light source configured to irradiate light from the inside of the prism; an external light source configured to irradiate light from the outside of the prism; an image sensor configured to acquire diffused light image by the internal light source and transmitted light image by the external light source; and a controller configured to compare the diffused light image and the transmitted light image acquired by the image sensor to determine whether the fingerprint is a fake fingerprint or not.

In the embodiment, wherein the external light source is configured to irradiate infrared rays.

In the embodiment, wherein the controller comprises: a light emitting control unit configured to turn on and turn off the internal light source and the external light source; and a fake fingerprint determination module configured to compare brightness values of the diffused light image and transmitted light image acquired by the image sensor to determine whether the fingerprint is a fake fingerprint or not.

In the embodiment, wherein the light emitting control unit is further configured to turn on one of the internal light source and the external light source in sequence.

In the embodiment, wherein the fake fingerprint determination module comprises: a brightness value acquiring unit configured to acquire brightness values ($f_{internal}(x,y)$, $f_{external}(x,y)$) at the same positions of the diffused light image and transmitted light image that are acquired; a function value calculating unit configured to calculate function values $K_{(x,y)}(f_{internal}(x,y), f_{external}(x,y))$ indicating the degree of access to the positions of ($f_{internal}(x,y)$, $f_{external}(x,y)$ when the position of a real fingerprint is ($f_{internal}(x,y)$, $f_{external}(x,y)$) in a plane having coordinates ($f_{internal}(x,y)$, $f_{external}(x,y)$); a summation unit configured to add one or more of the values $K_{(x,y)}(f_{internal}(x,y), f_{external}(x,y))$; and a determination unit configured to determine whether the fingerprint is a faked fingerprint or not depending on whether the sum value is above a preset threshold value.

In accordance with another aspect of the present invention, there is provided a method for identifying a fake fingerprint in an apparatus, wherein the apparatus includes a prism having a fingerprint contact surface with which a fingerprint comes in contacted; an internal light source configured to irradiate light from the inside of the prism; and an external light source configured to irradiate light from the outside of the prism, which includes: acquiring diffused light image by the internal light source and transmitted light image by the external light source; and determining whether or not the fingerprint is a fake fingerprint by comparing brightness values of the diffused light image and the transmitted light image that are acquired.

In the embodiment, wherein said acquiring diffused light image and transmitted light image comprises: acquiring one of the diffused light image and the transmitted light image in sequence.

In the embodiment, wherein said determining whether or not the fingerprint is a fake fingerprint comprises: acquiring brightness values ($f_{internal}(x,y)$, $f_{external}(x,y)$) at the same positions of the diffused light image and transmitted light image that are acquired; calculating function values $K_{(x,y)}$ ($f_{internal}(x,y)$, $f_{external}(x,y)$) indicating the degree of access to the positions of ($f_{internal}(x,y)$, $f_{external}(x,y)$) when the position of a real fingerprint is ($f_{internal}(x,y)$, $f_{external}(x,y)$) in a plane having coordinates ($f_{internal}(x,y)$, $f_{external}(x,y)$); summing one or more of the function values $K_{(x,y)}(f_{internal}(x,y), f_{external}(x,y))$ calculated; and determining whether or not the fingerprint is a faked fingerprint depending on whether the sum value is above a preset threshold value.

In the embodiment, wherein the function values $K_{(x,y)}$ ($f_{internal}(x,y)$, $f_{external}(x,y)$) are stored as the distribution of possible brightness values at their relevant positions of the fake and real fingerprint that are analyzed/determined in advance.

In the embodiment, wherein the function values $K_{(x,y)}$ ($f_{internal}(x,y)$, $f_{external}(x,y)$) are set in advance to be close to '1' for the real fingerprint, and the function values $K_{(x,y)}(f_{internal}(x,y), f_{external}(x,y))$ are set in advance to be close to '0' for the fake fingerprint.

In the embodiment, wherein said determining whether or not the fingerprint is a fake fingerprint comprises: acquiring brightness values ($f_{internal}(x,y)$, $f_{external}(x,y)$) at the same positions of the diffused light image and transmitted light image that are acquired, wherein the brightness values are the brightness values acquired in a unit of blocks composed of two or more pixels.

As set forth above, the embodiment of the present invention provides an apparatus and method for identifying the fake fingerprint by analyzing the correlation between the images formed and is robust to the change in degree of contact between a fingerprint and a prism depending on the state of a fingerprint.

BRIEF DESCRIPTION OF THE DRAWINGS

The above and other objects and features of the present invention will become apparent from the following description of the embodiments given in conjunction with the accompanying drawings, in which:

FIG. 7 is a flowchart illustrating an operation of determining whether a fingerprint is a faked one or not in accordance with an embodiment of the present invention.

DETAILED DESCRIPTION OF THE EMBODIMENTS

Hereinafter, the embodiments of the present invention will be described in detail with reference to the accompanying drawings so that they can be readily understood and realized by those skilled in the art.

In the following description, well-known functions or constitutions will not be described in detail if they would unnecessarily obscure the gist of the embodiments of the invention.

Before describing the embodiments of the present invention, the terminologies to be described across the specification may vary depending on a user's or operator's intention or practice. Accordingly, the definition of the terminologies may be made on a basis of the content throughout the specification.

Figure 1:
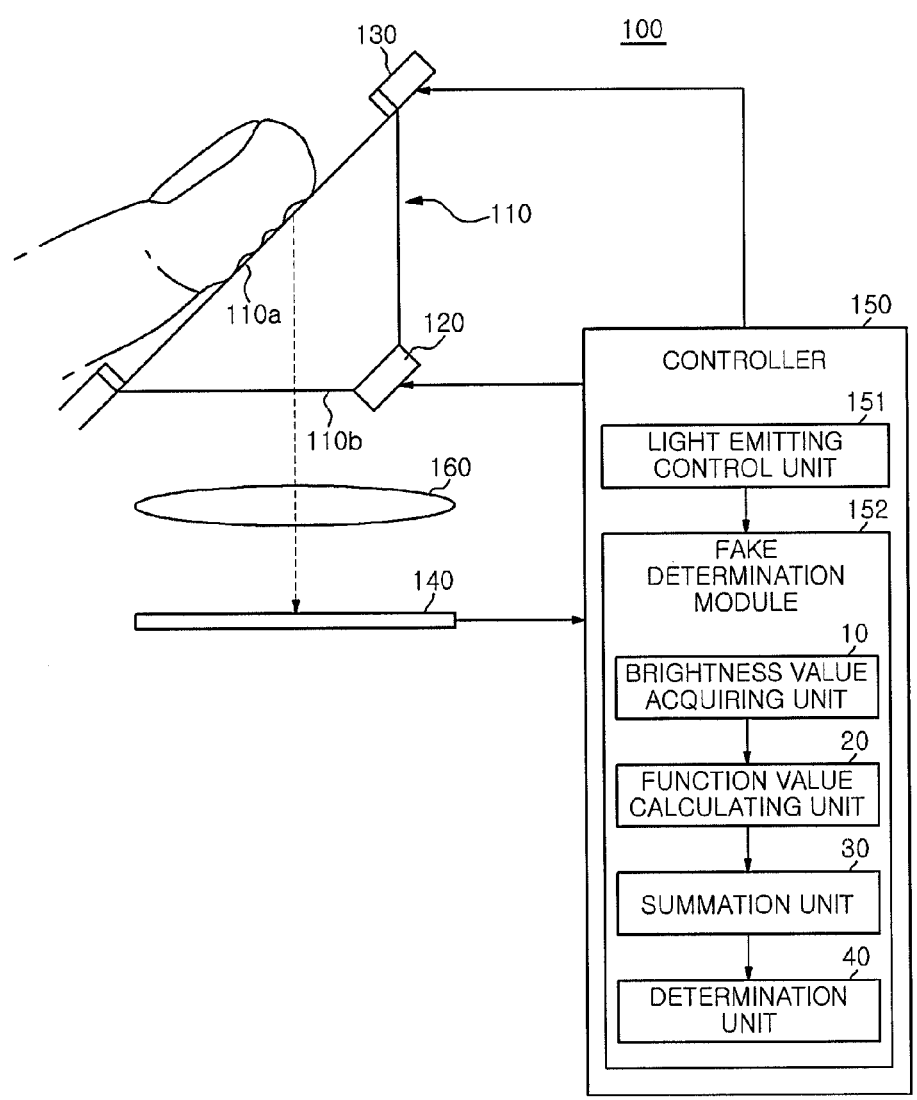
FIG. 1 is a configuration diagram of an apparatus for identifying fake fingerprint in accordance with an embodiment of the present invention.

FIG. 1 is a configuration diagram of an apparatus for identifying fake fingerprint in accordance with an embodiment of the present invention.

Referring to FIG. 1, an apparatus for identifying fake fingerprint 100 includes a prism 110, an internal light source 120, an external light source 130, an image sensor 140, and a controller 150. Additionally, the fake fingerprint identifying apparatus 100 may further include an optical lens 160 for image formation of image information of a fingerprint.

The prism 110 includes a fingerprint contact surface 110a and an exit surface 110b from which the light reflected or diffused from a fingerprint contact surface 110a (i.e., fingerprint image) is exited. The prism 110, as shown in FIG. 1, may have a sectional shape (or a sectional shape excluding the surfaces that are not used optically) of three sides (triangle) or four sides (trapezoid). Alternatively, a light reflector of a broad concept may be used on behalf of the prism 110.

When a user contacts a finger to the prism 110, the prism 110 acquires a fingerprint of a finger located on the fingerprint contact surface 110a. First, a definition is as follows: a ridge is a raised portion of a fingerprint of a finger and a valley is a recessed portion of a fingerprint of a finger. When a fingerprint of the user is putted on the prism 110, the raised ridges come into contact with the fingerprint contact surface 110a and the valleys are spaced from the fingerprint contact surface 110a at a certain distance in comparison to the ridges.

The internal and external light sources 120 and 130 irradiate light to a part of the fingerprint of the finger. When the light irradiated from the light sources 120 and 130 is entered into the prism 110, a portion of the light is reflected from the ridges and directed to the interior of the optical fingerprint recognition apparatus 100, and a remainder of the light is exited from the prism 110. The light reflected from the ridges is then incident on the image sensor 140 by passing through the optical lens 160 and is detected as a fingerprint shape image.

However, although it is possible to detect the light that passes through the finger, which is in contact with the prism the prism 110, from the external light source 130, the detected light is influenced by the degree of the contact between the fingerprint's ridge and the fingerprint contact surface 110a. Therefore, in accordance with an embodiment of the present invention, the light sources include the internal light source 120 and the external light source 130, so that a diffused light image formed by the internal light source 120 is acquired from a diffusive fingerprint sensor and is analyzed the correlation between the acquired diffused light image and the transmitted light image formed by the external light source 130, respectively, thereby identifying the fake fingerprint.

Figure 2:
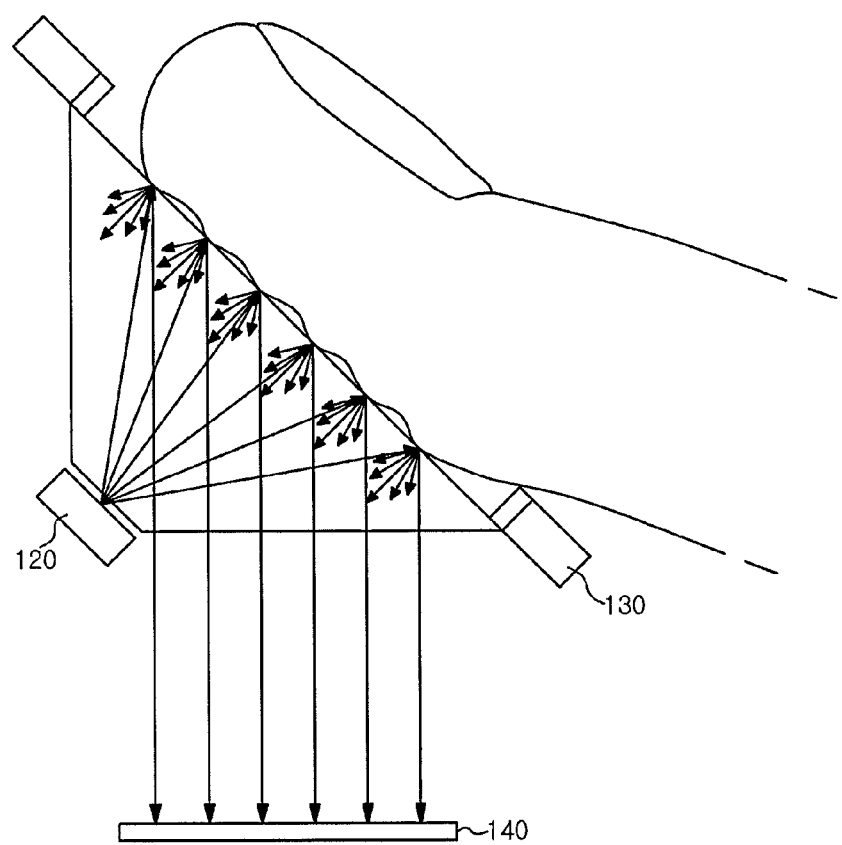
FIG. 2 shows a state where a diffused light image formed by an internal light source is acquired in accordance with an embodiment of the present invention.

FIG. 2 shows a state where a diffused light image formed by the internal light source is acquired in accordance with an embodiment of the present invention.

Referring to FIGS. 1 and 2, the light irradiated from the internal light source 120 is imaged on the optical lens 160 while passing through the fingerprint contact surface 110a and the exit surface 110b of the prism 110 and then is incident on the image sensor 140. In this regard, the light emitted from the internal light source 120 is incident on the fingerprint contact surface 110a in an angle less than a threshold angle necessary for a right-angle reflection or total reflection. The light emitted from the internal light source 120 is passed through or diffused by the ridges and valleys of the fingerprint that is in contact with the fingerprint contact surface 110a to form the fingerprint image.

Figure 3:
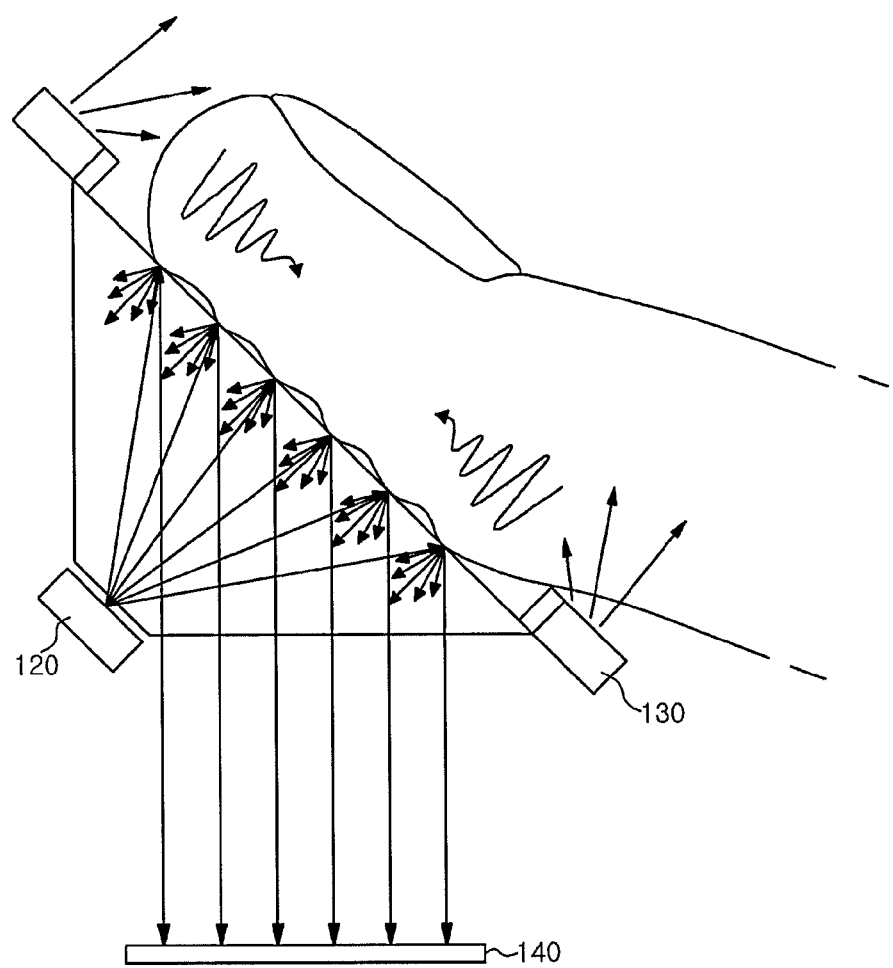
FIG. 3 shows a state where a transmitted light image formed by an external light source is acquired in accordance with an embodiment of the present invention.

FIG. 3 shows a state where a transmitted light image formed by the internal light source is acquired in accordance with an embodiment of the present invention.

Referring to FIGS. 1 and 3, the external light source 130 is disposed in both sides of the fingerprint contact surface 110a to irradiate light toward the fingerprint contact surface 110a. In this regard, it is preferred that the external light source 130 emits infrared rays. As an object for fingerprint scanning contacts with the fingerprint contact surface 110a, the light emitted from the external light source 130 is irradiated to the object placed on the fingerprint contact surface 110a, is transmitted in accordance with the characteristic of the object and then is directed to the prism 110 or reflected or deflected from the object.

Referring back to FIG. 1, the image sensor 140 generates a digital fingerprint image signal of an electrical signal corresponding to the fingerprint image that is incident thereon, thereby an image of the fingerprint contacted with the fingerprint contact surface 110a. The image sensor 140 is a typical optical fingerprint sensor, which may be implemented by a CCD (Charged Coupled Device) or CMOS (Complementary Metal-Oxide Semiconductor) device, to detect a fingerprint shape image produced by the light source. In accordance with the embodiment of the present invention, the image sensor 140 varies the value of the electrical signal in conformity with the amount of the light to produce an image. For example, if no light, it outputs an image in black, and if the maximum amount of incident light is provided, it outputs an image in white.

The controller 150 controls overall operations of the optical fingerprint recognition apparatus 100 inclusive of acquiring the fingerprint image. More specifically, the control unit 150 includes a light emitting control unit 151 and a fake determination module 152 and determines whether the fingerprint contacted with the fingerprint contact surface 110a is a living body fingerprint or a fake fingerprint.

The light emitting control unit 151 controls the turn-on and turn-off of the internal light source 120 and the external light source 130. When the object comes in contact with the fingerprint contact surface 110a, the light emitting control unit 151 turns on either one of the internal light source 120 or the external light source 130 so that it acquire either the diffused light image or the transmitted light image. Next, while the light emitting control unit 151 turns off one of the internal light source 120 or the external light source 130 that is turned on, it turns on another one of the internal light source 120 or the external light source 130 that is turned off, thereby acquiring either one of the diffused light image or transmitted light image in sequence.

The fake determination module 152 determines whether the contacted fingerprint is the fake fingerprint or not using the correlation of the brightness values between the diffused light image and the transmitted light image. More specifically, the fake determination module 152 includes a brightness value acquiring unit 10, a function value calculating unit 20, a summation unit 30, and a determination unit 40.

Figure 4A:
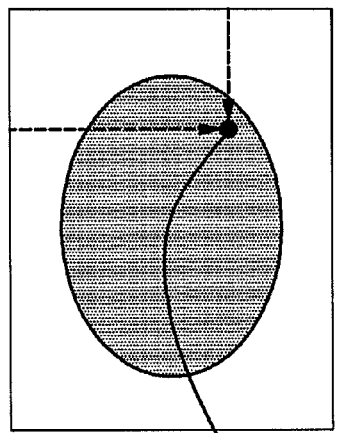
FIGS. 4A and 4B are exemplary diagrams illustrating an example of an acquisition of brightness values at the same positions of the fingerprint images formed by the internal and external light sources in accordance with an embodiment of the present invention.
Figure 4B:
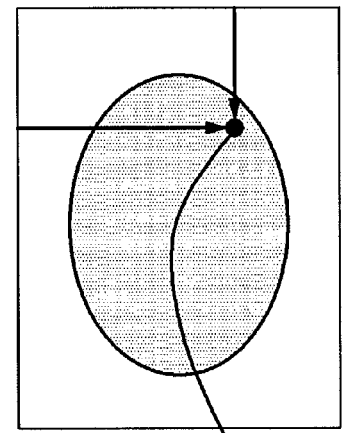
Figure 5:
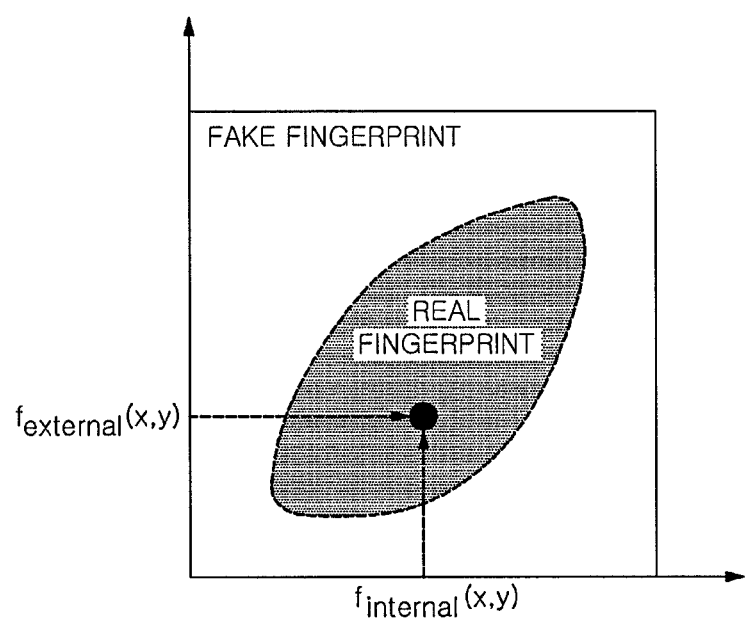
FIG. 5 is an exemplary diagram illustrating an example to determine whether a fingerprint is a faked one or not based on the correlation of brightness values in accordance with an embodiment of the present invention.

The components of the fake determination module 152 will be described in detail with reference to FIGS. 4 and 5. FIGS. 4A and 4B are exemplary diagrams illustrating the acquisition of brightness values at the same positions of the fingerprint images formed by the internal and external light sources in accordance with an embodiment of the present invention; and FIG. 5 is an exemplary diagram illustrating an example to determine whether the fingerprint is the fake fingerprint or not based on the correlation of the brightness value in accordance with an embodiment of the present invention.

The brightness value acquiring unit 10 acquires brightness values at the same positions of the diffused light image and the transmitted light image that are acquired. In other words, referring to FIG. 4, the brightness value acquiring unit 10 acquires a brightness value $f_{internal}(x, y)$ at coordinates $(x, y)$ in the diffused light image and a brightness value $f_{external}(x, y)$ at coordinates $(x, y)$ for the transmitted light image.

When a position of a real fingerprint is $(f_{internal}(x,y), f_{external}(x,y))$ in a plane having coordinates $(f_{internal}(x,y), f_{external}(x,y))$, the function value calculating unit 20 calculates a function value $K_{(x,y)}(f_{internal}(x,y), f_{external}(x,y))$ indicative of the degree of access to the position $(f_{internal}(x,y), f_{external}(x,y))$.

Here, the function value $K_{(X,Y)}(f_{internal}(x,y), f_{external}(x,y))$ may be stored in advance as the distribution of possible brightness values at the relevant positions of the fake and real fingerprint that are analyzed/determined. Therefore, the fake determination module 152 may detect a value of $K_{(X,Y)}(f_{internal}(x,y), f_{external}(x,y))$ that is mapped to the $(f_{internal}(x,y), f_{external}(x,y))$ from among the pre-stored brightness values. For a real fingerprint, the function value $K_{(X,Y)}(f_{internal}(x,y), f_{external}(x,y))$ may be set in advance to be close to '1'; and for a fake fingerprint, the function value $K_{(X,Y)}(f_{internal}(x,y), f_{external}(x,y))$ may be set in advance to be close to '0'. That is, referring to FIG. 5, in a plane having coordinates $(f_{internal}(x,y), f_{external}(x,y))$, the function value $K_{(X,Y)}(f_{internal}(x,y), f_{external}(x,y))$ may be set to be close to '1' when the position of $(f_{internal}(x,y), f_{external}(x.y))$ is included in a real fingerprint area; and the function value $K_{(x,y)}(f_{internal}(x,y), f_{external}(x,y))$ may be set to be close to '0' when the position of $(f_{internal}(x,y), f_{external}(x,y))$ is included in a fake fingerprint area, $K_{(x,y)}(f_{internal}(x,y))$. By performing the aforementioned process, a separation boundary can be defined as shown in FIG. 5. However, this separation boundary may be changed depending on sampling positions of the brightness values, and $K_{(x,y)}(f_{internal}(x,y), f_{external}(x,y))$ may be set by various learning based classification techniques (e.g., Baysian, MLP, SVM, etc.).

The summation unit 30 totals the calculated function values $K_{(x,y)}(f_{internal}(x,y), f_{external}(x,y))$ using the following Equation 1. That is, the summation unit 30 takes all the values $K_{(x,y)}(f_{internal}(x,y), f_{external}(x,y))$ for the respective pixel in the fingerprint area and totals the values.

$$S = \sum_{(x,y) \in fingerprintarea} K_{(x,y)}(f_{internal}(x,y), f_{external}(x,y)) \quad \text{[Equation 1]}$$

The determination unit 40 determines whether the contacted fingerprint is the fake fingerprint or not depending on the determination that the sum value 'S' is over a threshold value. That is, when the sum value 'S' is over the threshold value, the fake determination module 152 outputs the result that the contacted fingerprint is the real fingerprint. Meanwhile, when the sum value 'S' is below the threshold value, the fake determination module 152 outputs the result that the contacted fingerprint is the fake fingerprint.

Alternatively, as another embodiment, it may be possible to identify whether the fingerprint image that is finally inputted for user authentication is derived from the fake fingerprint by determining whether the ratio of the number of pixels that is above or below the threshold value within a limited particular area of interest (e.g., the fingerprint area) is over a specific threshold.

Or, because the definition of the boundary of the brightness value for each pixel may require an intensive computational load and storage space, it may be possible to segment the fingerprint area into several blocks and save the determination boundary for each block in advance.

Figure 6:
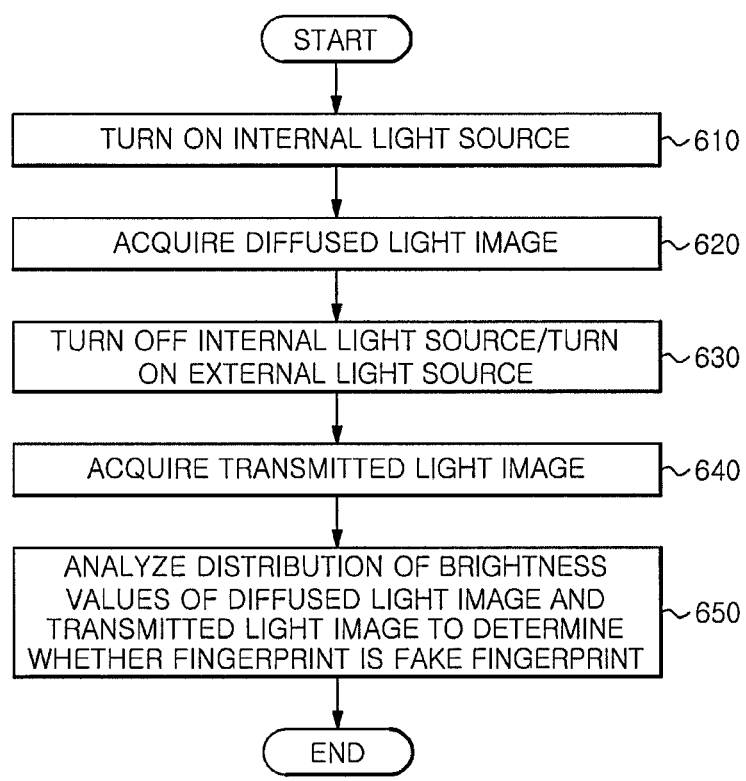
FIG. 6 is a flowchart illustrating a method for identifying fake fingerprint in accordance with an embodiment of the present invention.

FIG. 6 is a flowchart illustrating a method for identifying a fake fingerprint in accordance with an embodiment of the present invention.

Referring to FIG. 6, as an object comes in contact with the fingerprint contact surface 110a, the light emitting control unit 151 of the controller 150 turns on the internal light source 130 in block 610. The image sensor 140 then acquires the diffused light image that is incident through the prism 110 as the internal light source 120 is turned on and provides the digital image signal to the fake determination module 152 of the controller 150, in block 620.

Next, the light emitting control unit 151 turns off the internal light source 120 but it turns on the external light source 130, in block 630. The image sensor 140 then acquires the transmitted light image that is incident through the prism 110 and provides the digital image signal to the fake determination module 152 of the controller 150 as the external light source 130 is turned on, in block 640.

FIG. 7 is a flowchart illustrating an operation of determining whether the contacted fingerprint is the fake fingerprint or not in accordance with an embodiment of the present invention.

Referring to FIG. 7, in block 710, the fake determination module 152 acquires the brightness values at the same positions of the diffused light image and transmitted light image that are acquired. That is, the brightness value $f_{internal}(x, y)$ at coordinates (x, y) in the diffused light image and the brightness value $f_{external}(x, y)$ at coordinates (x, y) in the transmitted light image are acquired.

After that, in block 720, in the case where the position of a real fingerprint is $(f_{internal}(x,y), f_{external}(x,y))$ in a plane having coordinates $(f_{internal}(x,y), f_{external}(x,y))$, the fake determination module 152 calculates a function value $K_{(x,y)}(f_{internal}(x,y), f_{external}(x,y))$ indicating the degree of access to the position of $(f_{internal}(x,y), f_{external}(x,y))$.

In this regard, the function value $K_{(X,Y)}(f_{internal}(x,y), f_{external}(x,y))$ may be stored as the distribution of the possible brightness values at its relevant positions of various fake and real fingerprints that are analyzed/determined in advance. Accordingly, the fake determination module 152 can detect a value of $K_{(X,Y)}(f_{internal}(x,y), f_{external}(x,y))$ that are mapped to the position $(f_{internal}(x,y), f_{external}(x,y))$ from among the pre-stored brightness values. For example, the function values $K_{(X,Y)}(f_{internal}(x,y), f_{external}(x,y))$ may be set in advance to be close to '1' for a real fingerprint, and the function value of $K_{(X,Y)}(f_{internal}(x,y), f_{external}(x,y))$ may be set in advance to be close to '0' for a fake fingerprint. That is, referring to FIG. 5, in a plane having coordinates $(f_{internal}(x,y), f_{external}(x,y))$, if the position of $(f_{internal}(x,y), f_{external}(x,y))$ is included in a real fingerprint area, $K_{(x,y)}(f_{internal}(x,y), f_{external}(x,y))$ may be set to be near '1', and if the positions of $(f_{internal}(x,y), f_{external}(x,y))$ is included in a fake fingerprint area, $K_{(x,y)}(f_{internal}(x,y), f_{external}(x,y))$ may be set to be near '0'. Accordingly, as shown in FIG. 5, the separation boundary between the fake fingerprint and the real fingerprint can be defined. However, the separation boundary may be changed depending on sampling points of the brightness values, and $K_{(x,y)}(f_{internal}(x,y), f_{external}(x,y))$ may be set by different learning based classification technique (e.g., Baysian, MLP, SVM, etc.).

Thereafter, in block 730, the fake determination module 152 totals the calculated function values of $K_{(x,y)}(f_{internal}(x,y), f_{external}(x,y))$ using the aforementioned Equation 1.

In block 740, the fake determination module 152 determines that there is another pixel value to be compared.

As a result of block 740, if there remains another pixel value, the method goes to block 710 where the fake determination unit 152 repeats block 710 to 730. That is, the values $K_{(x,y)}(f_{internal}(x,y), f_{external}(x,y))$ for all of the pixels in the fingerprint area are acquired and added all together.

However, as a result of block 740, if there no longer remains another pixel value, the fake determination module 152 determines that the sum value is over a threshold value in block 750.

As a result of block 750, if it is determined that the sum value is over the threshold value, the fake determination module 152 outputs the result that the contacted fingerprint is the real fingerprint in block 760.

However, as a result of block 750, if it is determined that the sum value is below the threshold value, the fake determination module 152 outputs the result that the contacted fingerprint is the fake fingerprint in block 770.

Alternatively, as another embodiment, it may be possible to identify whether the fingerprint image that is finally inputted is derived from the fake fingerprint by determining whether the ratio of the number of pixels that is above or below the threshold within a limited particular area of interest (e.g., the fingerprint area) is over a specific threshold.

Or, because the definition of the boundary of the brightness value for each pixel may require an intensive computational load and storage space, it may be possible to segment the fingerprint area into several blocks composed of two or more pixels and save the determination boundary for each block in advance. That is, the brightness values are acquired at the same positions of the diffused light image and transmitted light image that are acquired wherein the brightness values are the values acquired in a unit of blocks composed of two or more pixels. While the fake fingerprint identifying method as mentioned above has been described in a sequence of processes, blocks S610 and S620 may be exchanged with blocks S630 and S640 in their orders.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for identifying a fake fingerprint, the apparatus comprising:
   a prism having a fingerprint contact surface with which a fingerprint comes in contacted;
   an internal light source configured to irradiate light from the inside of the prism;
   an external light source configured to irradiate light from the outside of the prism;
   an image sensor configured to acquire diffused light image by the internal light source and transmitted light image by the external light source; and
   a controller configured to compare the diffused light image and the transmitted light image acquired by the image sensor to determine whether the fingerprint is a fake fingerprint or not.

2. The apparatus of claim 1, wherein the external light source is configured to irradiate infrared rays.

3. The apparatus of claim 1, wherein the controller comprises:
   a light emitting control unit configured to turn on and turn off the internal light source and the external light source; and
   a fake fingerprint determination module configured to compare brightness values of the diffused light image and transmitted light image acquired by the image sensor to determine whether the fingerprint is a fake fingerprint or not.

4. The apparatus of claim 3, wherein the light emitting control unit is further configured to turn on one of the internal light source and the external light source in sequence.

5. The apparatus of claim 3, wherein the fake fingerprint determination module comprises:
   a brightness value acquiring unit configured to acquire brightness values ($f_{internal}(x,y)$, $f_{external}(x,y)$) at the same positions of the diffused light image and transmitted light image that are acquired;
   a function value calculating unit configured to calculate function values $K_{(x,y)}(f_{internal}(x,y), f_{external}(x,y))$ indicating the degree of access to the positions of ($f_{internal}(x,y)$, $f_{external}(x,y)$) when the position of a real fingerprint is ($f_{internal}(x,y)$, $f_{external}(x,y)$) in a plane having coordinates ($f_{internal}(x,y)$, $f_{external}(x,y)$);
   a summation unit configured to add one or more of the values $K_{(x,y)}(f_{internal}(x,y), f_{external}(x,y))$; and
   a determination unit configured to determine whether the fingerprint is a faked fingerprint or not depending on whether the sum value is above a preset threshold value.

6. A method for identifying a fake fingerprint in an apparatus, wherein the apparatus includes a prism having a fingerprint contact surface with which a fingerprint comes in contacted; an internal light source configured to irradiate light from the inside of the prism; and an external light source configured to irradiate light from the outside of the prism, the method comprising:
   acquiring diffused light image by the internal light source and transmitted light image by the external light source; and
   determining whether or not the fingerprint is a fake fingerprint by comparing brightness values of the diffused light image and the transmitted light image that are acquired.

7. The method of claim 6, wherein said acquiring diffused light image and transmitted light image comprises:
   acquiring one of the diffused light image and the transmitted light image in sequence.

8. The method of claim 6, wherein said determining whether or not the fingerprint is a fake fingerprint comprises:
   acquiring brightness values ($f_{internal}(x,y)$, $f_{external}(x,y)$) at the same positions of the diffused light image and transmitted light image that are acquired;
   calculating function values $K_{(x,y)}(f_{internal}(x,y), f_{external}(x,y))$ indicating the degree of access to the positions of ($f_{internal}(x,y)$, $f_{external}(x,y)$) when the position of a real fingerprint is ($f_{internal}(x,y)$, $f_{external}(x,y)$) in a plane having coordinates ($f_{internal}(x,y)$, $f_{external}(x,y)$);
   summing one or more of the function values $K_{(x,y)}(f_{internal}(x,y), f_{external}(x,y))$ calculated; and
   determining whether or not the fingerprint is a faked fingerprint depending on whether the sum value is above a preset threshold value.

9. The method of claim 8, wherein the function values $K_{(x,y)}(f_{internal}(x,y), f_{external}(x,y))$ are stored as the distribution of possible brightness values at their relevant positions of the fake and real fingerprint that are analyzed/determined in advance.

10. The method of claim 8, wherein the function values $K_{(x,y)}(f_{internal}(x,y), f_{external}(x,y))$ are set in advance to be close to '1' for the real fingerprint, and the function values $K_{(x,y)}(f_{internal}(x,y), f_{external}(x,y))$ are set in advance to be close to '0' for the fake fingerprint.

11. The method of claim 6, wherein said determining whether or not the fingerprint is a fake fingerprint comprises:
   acquiring brightness values ($f_{internal}(x,y)$, $f_{external}(x,y)$) at the same positions of the diffused light image and transmitted light image that are acquired,
   wherein the brightness values are the brightness values acquired in a unit of blocks composed of two or more pixels.

* * * * *